(12) United States Patent
Aydin et al.

(10) Patent No.: US 8,086,723 B2
(45) Date of Patent: Dec. 27, 2011

(54) APPARATUS AND METHODS FOR MANAGING COMMUNICATION SYSTEM RESOURCES

(75) Inventors: Arkin Aydin, Nepean (CA); Bo Liu, Kanata (CA); Lucien Marcotte, Ottawa (CA); Guy Landry, Kanata (CA); Koen Jan Van De Weyer, Lokeren (BE); Sven Dhuyvetter, Sint Katelijne Waver (BE)

(73) Assignee: Alcatel Lucent, Paris (FR)

( * ) Notice: Subject to any disclaimer, the term of this patent is extended or adjusted under 35 U.S.C. 154(b) by 1063 days.

(21) Appl. No.: 11/383,852

(22) Filed: May 17, 2006

(65) Prior Publication Data

US 2007/0271369 A1 Nov. 22, 2007

(51) Int. Cl.
G06F 15/173 (2006.01)

(52) U.S. Cl. ........................................ 709/224; 709/223

(58) Field of Classification Search .......... 709/220–226; 370/241, 250
See application file for complete search history.

(56) References Cited

U.S. PATENT DOCUMENTS

| | | | | | |
|---|---|---|---|---|---|
| 5,263,165 | A | * | 11/1993 | Janis | 711/163 |
| 5,361,293 | A | * | 11/1994 | Czerwiec | 379/27.02 |
| 5,982,753 | A | * | 11/1999 | Pendleton et al. | 370/252 |
| 6,009,275 | A | * | 12/1999 | DeKoning et al. | 710/220 |
| 6,714,976 | B1 | * | 3/2004 | Wilson et al. | 709/224 |
| 7,079,010 | B2 | * | 7/2006 | Champlin | 340/286.02 |
| 7,103,802 | B2 | * | 9/2006 | Stephens et al. | 714/32 |
| 7,533,181 | B2 | * | 5/2009 | Dawson et al. | 709/229 |
| 2002/0052950 | A1 | * | 5/2002 | Pillai et al. | 709/224 |
| 2003/0093501 | A1 | * | 5/2003 | Carlson et al. | 709/220 |
| 2003/0145084 | A1 | * | 7/2003 | McNerney | 709/224 |
| 2004/0010627 | A1 | * | 1/2004 | Ellis et al. | 709/250 |
| 2004/0024732 | A1 | * | 2/2004 | Klisch et al. | 707/1 |
| 2006/0092941 | A1 | * | 5/2006 | Kusama | 370/392 |
| 2006/0280207 | A1 | * | 12/2006 | Guarini et al. | 370/524 |
| 2007/0011300 | A1 | * | 1/2007 | Hollebeek et al. | 709/224 |
| 2007/0038732 | A1 | * | 2/2007 | Chandwani et al. | 709/223 |
| 2007/0100987 | A1 | * | 5/2007 | Aggarwal et al. | 709/224 |
| 2008/0071917 | A1 | * | 3/2008 | Petrovykh | 709/230 |

* cited by examiner

*Primary Examiner* — Joshua Joo

(74) *Attorney, Agent, or Firm* — Eckert Seamans Cherin & Mellot LLC

(57) ABSTRACT

Apparatus and methods for managing communication system resources are disclosed. Based on status information received from a resource itself or from other sources, an operational status of a maintenance resource to perform a predetermined maintenance operation on a target communication system resource, for example, may be determined. Access to use resources in performing operations may also be controlled. Resource access is granted or denied based on an availability status of a resource. Other parameters such as relative priorities of a new request to use a resource and a current operation for which access to use the resource was previously granted may also be used in determining whether to grant access to use a resource. A resource may be reclaimed for a higher priority operation for instance. Redundant or alternate resources may also be identified where a resource is not operational or otherwise not available.

28 Claims, 7 Drawing Sheets

APPARATUS AND METHODS FOR MANAGING COMMUNICATION SYSTEM RESOURCES

FIELD OF THE INVENTION

This invention relates generally to communications and, in particular, to managing communication system resources.

BACKGROUND

Maintenance of communication lines, such as Metallic Test Access (MTA) testing for instance, commonly involves using external test heads located near communication equipment to be tested. Once a user either manually verifies, or simply assumes, that required testing resources are present and operational, test functions can be attempted using an external test head.

With distributed equipment architectures such as remote Digital Subscriber Line (DSL) Access Multiplexers (DSLAMs) that are deployed to extend the reach of DSL service from a Central Office (CO), it tends to be more difficult to verify whether resources such as external cables connecting distributed equipment shelves and internal relays that switch internal test buses are operational and available when needed. Where switched test paths are provided between distributed equipment, a testing system becomes even more complex, presenting another challenge for testing management.

Further complicating the goal of testing management is the fact that resources required to perform a test may involve multiple electronic circuit cards that can be put into and taken out of service as a result of being assigned to other tests, communication equipment servicing, or failures.

Similar challenges may also affect other types of operations than testing, and other types of resources than those used for testing communication systems.

Thus, there remains a need for improved techniques for managing communication system resources.

SUMMARY OF THE INVENTION

In accordance with an embodiment of the present invention, the status of various resources, including their configurations, are maintained in order to request and reserve available resources for performing operations such as maintenance operations.

Some embodiments of the invention provide a resource manager that manages the use of resources within distributed communication equipment and determines the availability of the resources to perform operations.

According to one aspect of the invention, an apparatus includes an interface and a resource monitor operatively coupled to the interface. The interface enables transfer of status information associated with a maintenance resource, the maintenance resource being for use in performing a maintenance operation on a target communication system resource, and the resource monitor is operable to determine, based on status information received through the interface, an operational status of the maintenance resource to perform a predetermined maintenance operation.

The interface may enable transfer of status information associated with a plurality of maintenance resources including the maintenance resource, in which case the resource monitor may be operable to determine a status of each maintenance resource of the plurality of maintenance resources to perform the predetermined maintenance operation.

The apparatus may also include a memory operatively coupled to the resource monitor. The resource monitor is further operable to store in the memory an indication of the determined operational status of the maintenance resource.

If the target resource comprises a communication line over which communications are supported by communication equipment, which includes the maintenance resource, the interface may be operatively coupled to a communication device that exchanges communication signals with the communication equipment. The status information may then be exchanged with the remote communication equipment in the communication signals according to an in-band signalling scheme.

The apparatus may be deployed, for example, in communication equipment that also includes the maintenance resource.

Where the communication equipment has a distributed architecture and comprises a plurality of equipment shelves, which support communications on respective communication lines and include respective maintenance resources for use in performing maintenance operations on the communication lines as target resources, one equipment shelf of the plurality of equipment shelves may include the interface and the resource monitor. In this case, the interface enables transfer of status information between the resource monitor and each maintenance resource of the one equipment shelf and between the resource monitor and each maintenance resource of each other equipment shelf of the plurality of equipment shelves. The resource monitor is then operable to determine an operational status of each maintenance resource of each equipment shelf of the plurality of equipment shelves.

Each equipment shelf of the plurality of equipment shelves may include an internal maintenance path, and respective external connections between the internal maintenance paths may be provided. At least one equipment shelf of the plurality of equipment shelves may include a test unit. The maintenance resources for which an operational status is determined may include any or all of each internal maintenance path, each test unit of the at least one equipment shelf, and each respective external connection between the internal maintenance paths.

The apparatus may also include an access controller operatively coupled to the resource monitor and operable to control access to use the maintenance resource for performing a maintenance operation.

A resource client interface may also be operatively coupled to the resource monitor to enable the resource monitor to exchange information with a resource client that is operable to use the maintenance resource to perform a maintenance operation. The resource monitor is operable to receive a maintenance operation request from the resource client through the resource client interface and to return to the resource client through the resource client interface, in response to the maintenance operation request, an indication of the determined operational status of the maintenance resource to perform the requested maintenance operation.

In some embodiments, the resource client interface is operatively coupled to the access controller and enables the access controller to exchange maintenance operation information with a resource client. The access controller is operable to receive a maintenance operation request from the resource client through the resource client interface, and to return to the resource client through the resource client interface a response to the request indicating whether access to use the maintenance resource is granted or denied.

According to another aspect of the invention, an apparatus includes a resource client interface for enabling exchange of operation information with a resource client, the resource client being operable to perform an operation using a communication system resource, and an access controller operatively coupled to the resource client interface and operable to determine an availability status of the resource and to control access to the resource by the resource client based on the determined availability status.

The operation may be a maintenance operation to be performed on a target communication system resource, in which case the resource comprises a maintenance resource. The target resource may be a communication line over which communications are supported by communication equipment, the communication equipment comprising a plurality of maintenance resources including the maintenance resource. In this case, the access controller is operable to determine an availability status of, and to control access to, each maintenance resource of the plurality of maintenance resources.

The access controller may be operable to receive from the resource client through the resource client interface a request for access to use the resource to perform an operation, and to return to the resource client through the resource client interface a response to the request indicating whether access to use the resource is granted or denied.

In some embodiments, the access controller is further operable, where access to use the resource is denied, to determine whether an alternate resource is available, and to grant access to use the alternate resource where an alternate resource is available.

The access controller may also be operable to update the availability status of the resource where access to use the resource is granted.

The access controller may determine a priority of the request, and determine whether access to use the resource should be granted or denied based on the availability status of the resource and the determined priority of the request.

A current operation for which access to use the resource was previously granted may be halted by the access controller, which may also grant access for the resource client to use the resource in response to the request where the request has a higher priority than the current operation.

The access controller may receive from the resource client through the resource client interface an indication that the operation for which access was granted to use the resource has completed, and update the availability status of the resource in response to receiving the indication.

The apparatus may also include a memory, operatively coupled to the access controller, for storing a record associated with the resource, the record comprising an indication of the availability status of the resource. In this case, the access controller may be operable to determine the availability status of the resource by accessing the record in the memory.

A machine-implemented method of managing a communication system resource for use in performing an operation is also provided, and includes receiving a request for access to use the resource in performing an operation, determining an availability status of the resource, and determining, based on the determined availability status, whether to grant or deny access to use the resource in response to the request.

The method may also include determining a priority of the request, in which case determining whether to grant or deny access to use the resource may involve determining whether to grant or deny access to use the resource based on the determined availability status of the resource and the determined priority of the request.

If a current operation for which access to use the resource was previously granted is in progress, the method may also include determining a priority of the current operation and, where the request has a higher priority than the current operation, halting the current operation and granting access to use the resource in response to the request.

Receiving a request for access to use the resource may involve receiving a request from a resource client. The method may then also involve, where access to use the resource is granted in response to the request, receiving from the resource client an indication that the operation has completed, and updating the availability status of the resource.

If access to use the resource is denied, the method may also include determining whether an alternate resource is available, and granting access to the alternate resource where an alternate resource is available.

The method may also include using the resource to perform the operation where access to the resource is granted.

Another aspect of the invention provides a machine-readable medium storing a data structure. The data structure includes an identifier of a maintenance resource, the maintenance resource being for use in performing a maintenance operation on a target communication system resource, and an indication of an operational status of the maintenance resource to perform a predetermined maintenance operation.

The data structure may also include an indication of an availability status of the maintenance resource.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
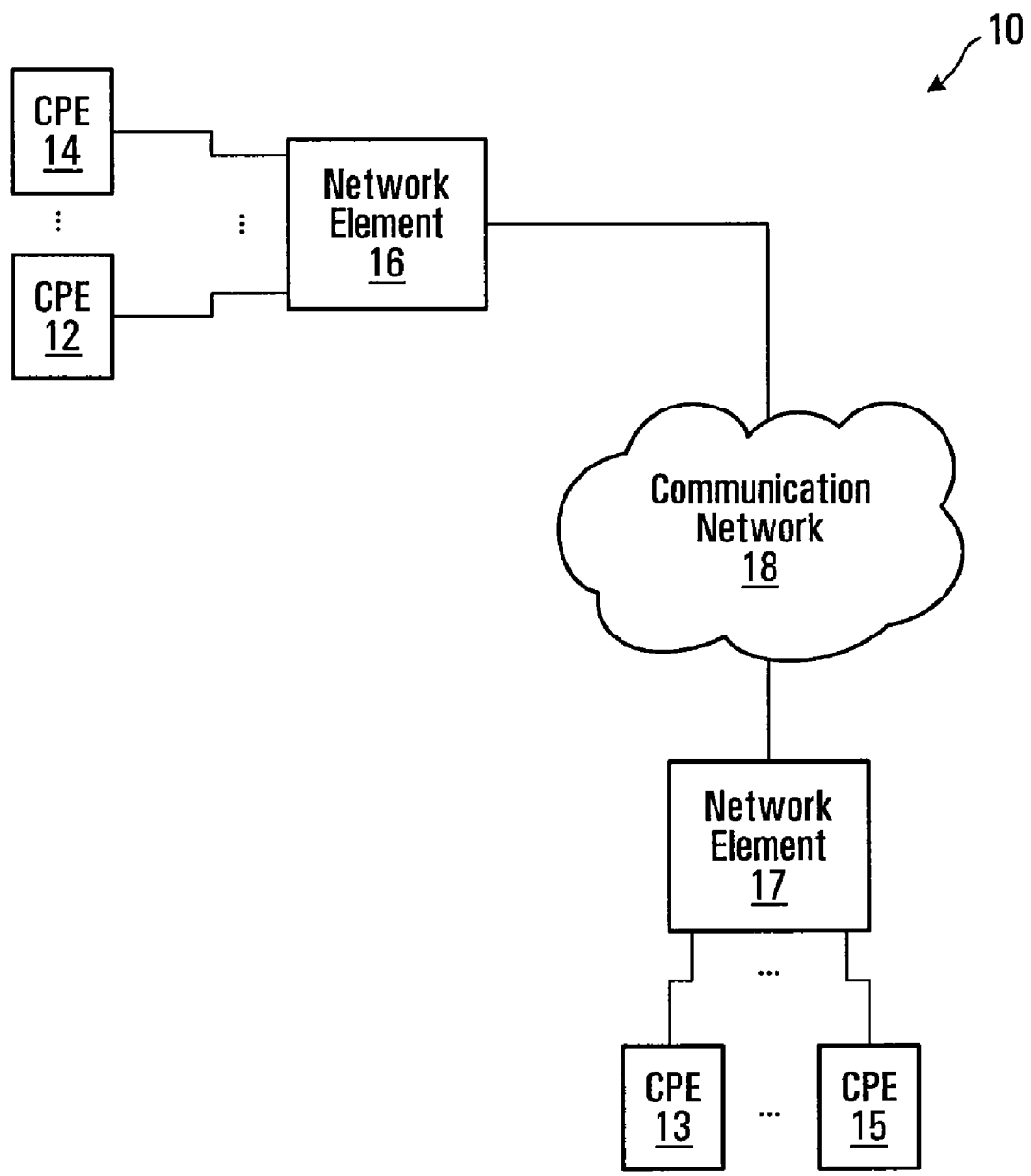
FIG. 1 is a block diagram of a communication system.

FIG. 1 is a block diagram of a communication system 10, in which embodiments of the invention could be implemented. The communication system 10 includes multiple Customer Premises Equipment (CPE) installations 12/14, 13/15, network elements 16, 17, and a communication network 18. Although only four CPEs 12/14, 13/15 and two network elements 16, 17 have been shown in FIG. 1 to avoid overly complicating the drawing, many more CPEs and network elements may be connected to the communication network 18. It should therefore be appreciated that the system of FIG. 1, as well as the contents of the other drawings, are intended solely for illustrative purposes, and that the present invention is in no way limited to the particular example embodiments explicitly shown in the drawings and described herein.

The CPEs 12/14, 13/15 represent communication equipment, illustratively end user communication devices, configured to receive and/or transmit communication signals.

Although shown as being directly connected to the network elements 16, 17, it will be apparent that CPEs 12/14, 13/15 may communicate with the network elements 16, 17 through other intermediate components (not shown). In one embodiment, the CPE connections are local twisted pair loops used for DSL communications.

Switches and routers are illustrative of the types of communication equipment represented by the network elements 16, 17. For example, where the CPE connections are DSL connections, the network elements 16, 17 may be DSLAMs.

The communication network 18, in addition to the network elements 16, 17, may also include other network elements which route communication signals through the communication network 18.

Many different types of end user, intermediate, and network communication equipment, as well as the operation thereof, will be apparent to those skilled in the art. In general, the network elements 16, 17 transfer communication signals between the communication network 18 and the CPEs 12/14, 13/15. According to one particular example implementation, the network elements 16, 17 communicate with other equipment in the communication network 18 through Gigabit-Ethernet (Gig-E) communication links, and communicate with the CPEs 12/14, 13/15 through DSL. However, embodiments of the invention are not limited to any particular types of communication equipment, transfer mechanisms, or protocols. The architectures and techniques disclosed herein may be used in conjunction with other than Ethernet and DSL communications.

As noted above, it may be desirable to distribute, rather than centralize, communication equipment. Communications over DSL, for instance, can be improved by locating communication network access equipment such as DSLAMs as close as possible to CPEs. Distributed systems, however, can present challenges in respect of managing maintenance operations.

Figure 2:
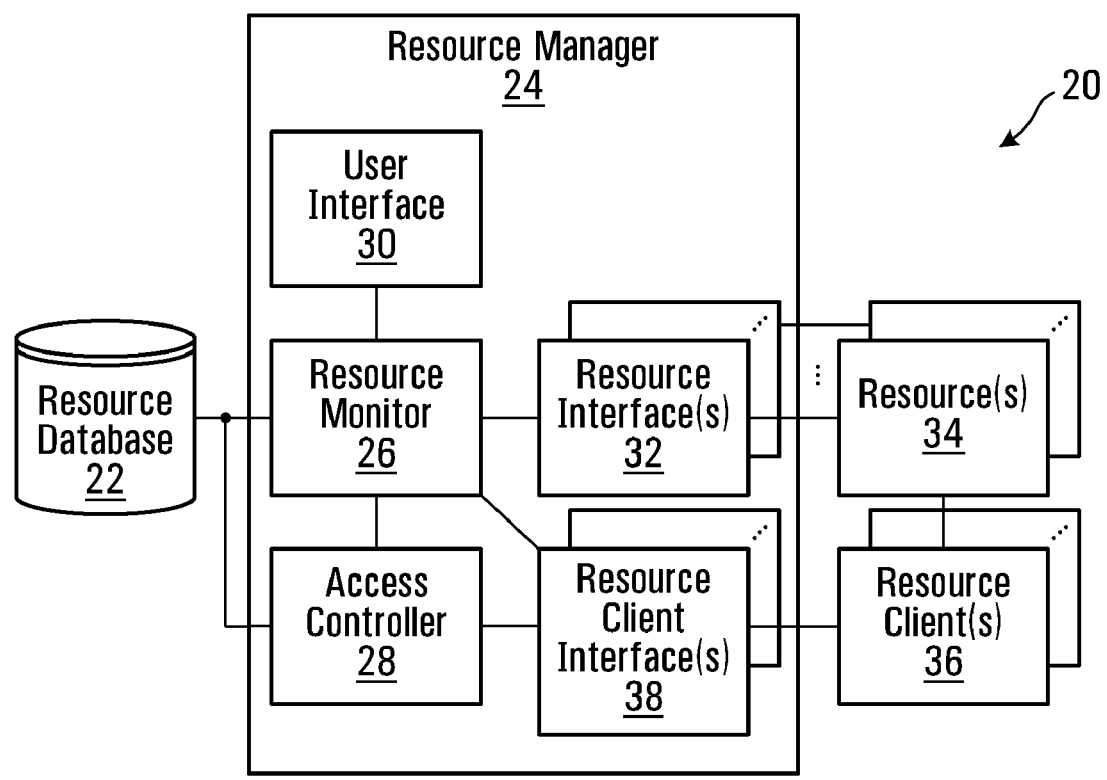
FIG. 2 is a block diagram of a communication system resource management apparatus.

FIG. 2 is a block diagram of a communication system resource management apparatus. The apparatus 20 includes a resource database 22, a resource manager 24 operatively coupled to the resource database, one or more resource clients 36 operatively coupled to the resource manager, and one or more resources 34 operatively coupled to the resource manager and to the resource client(s). The resource manager 24 includes a resource monitor 26 operatively coupled to the resource database 22, a user interface 30 operatively coupled to the resource monitor, an access controller 28 operatively coupled to the resource monitor and to the resource database, one or more resource client interface(s) 38 operatively coupled to the access controller and to the resource monitor, and one or more resource interface(s) 32 operatively coupled to the resource monitor.

The apparatus 20 represents an example of one possible implementation of an embodiment of the invention. The invention is in no way limited to the specific example shown in FIG. 2. For example, the functions of the resource monitor 26 and the access controller 28 could be supported by a single functional element in other embodiments. Thus, more generally, embodiments of the invention may have fewer, further, or different components with similar or different interconnections than shown in FIG. 2 and the other drawings.

The types of connections through which the components of FIG. 2 are operatively coupled may, to at least some extent, be implementation-dependent. Communication equipment components often use various types of physical connectors and wired connections. In the case of cooperating software functions, for example, an operative coupling may be through variables or registers, and thus be a form of logical coupling rather than a physical coupling.

The resource database 22 includes resource data records stored in a memory, such as a solid state memory device or a memory device that operates in conjunction with a movable or removable storage medium.

Any or all of the other components of the apparatus 20, however, may be implemented in hardware, software, firmware, or combinations thereof. Electronic devices that may be suitable for this purpose include, among others, microprocessors, microcontrollers, Programmable Logic Devices (PLDs), Field Programmable Gate Arrays (FPGAs), Application Specific Integrated Circuits (ASICs), and other types of "intelligent" integrated circuits. The apparatus 20 is therefore described herein primarily in terms of its function. Based on the functional description, a person skilled in the art will be enabled to implement the apparatus 20 in any of various ways.

In operation, a resource interface 32 enables the apparatus 20, and in particular the resource monitor 26, to obtain status information associated with the resource(s) 34, which may be located in the same communication equipment shelf as the resource manager 24 or in a different equipment shelf in a distributed architecture, for example. In some embodiments, the resource manager 24 is deployed in one equipment shelf in a distributed equipment architecture and both one or more local resource interfaces and one or more remote resource interfaces are also provided in that equipment shelf. The resource monitor 26 is thereby enabled to exchange status information with resources in the same shelf through the local resource interface(s) and with resources in other shelves of the distributed equipment through the remote resource interface(s) and compatible, or identical, resource interfaces in the other shelves.

Those skilled in the art will be familiar with many different types of interfaces that may be used for this purpose. The specific structure and operation of a resource interface will be dependent upon the medium and transfer mechanism that are to be used to exchange resource status information. According to one embodiment, a local resource interface is physically connected to a local resource through an equipment backplane or other internal connection, whereas a remote resource interface is operatively coupled to a local communication device (not shown) that exchanges communication signals with other communication equipment, illustratively another equipment shelf in which a remote resource is located. In the case of the remote resource interface, status information may be exchanged with the remote shelf in the communication signals, according to an in-band signalling scheme.

For example, the apparatus 20 could be implemented at a host shelf of a distributed DSLAM that exchanges communication signals with a CO and with expansion shelves of the distributed DSLAM. The status information may be exchanged with the DSLAM expansion shelves by remote resource interfaces through other components, implemented at the host shelf, that also allow the host shelf to exchange communication traffic with the expansion shelves.

Another possible mechanism through which the resource manager 24 may receive or otherwise obtain information associated with the resource(s) 34 is represented in FIG. 2 as the user interface 30. Using an operator console or other input system, a user might enter information that indicates to the resource manager 24 that an external test cable has been installed between two equipment shelves, for instance.

Thus, the resource manager 24 may obtain resource information from multiple sources through the same or different types of interfaces.

A resource 34 represents a component that can be used by a resource client 36 to perform an operation or function. In one embodiment, the resource(s) 34 include maintenance resources such as a test unit and test connections for performing maintenance operations on one or more communication lines.

In the present disclosure, techniques according to embodiments of the invention are described primarily with reference to maintenance operations that are performed on communication lines using maintenance resources. However, it should be appreciated that the present invention may be used to manage other types of resources than maintenance resources and/or other types of operations than maintenance operations performed on communication lines or other target resources. References herein to resources and operations should be interpreted accordingly.

The resource monitor 26 is operable to determine an operational status of the resource(s) 34 based on the status information it obtains through the resource interface(s) 32, the user interface 30, and/or possibly some other type of interface. Status information may include, for example, a response to a request or query that is sent to a resource or communication equipment in which the resource is deployed. Handling of such queries, and other possible status transfer mechanisms, are described in further detail below.

Operational status of a resource may include various parameters. The resource monitor 26, for example, may detect the presence of a resource. If a resource is configurable, then the configuration of the resource may also be determined by the resource monitor 26. This could be accomplished through a query and response mechanism or an automatic update procedure. As those skilled in the art will appreciate, some types of communication equipment allow components to register for change notices or similar alerts that are generated when new components are installed in a system, existing components fail or are removed from a system, or configuration changes are made. Thus, the resource monitor 26 might be registered to receive such notices or alerts through the resource interface(s) 32 so as to discover new components and to detect failures, removals, and/or configuration changes.

Where the resource manager 24 manages multiple resources 34, the resource monitor 26 determines a status of each of those resources. This may involve repeating determination tasks for each resource 34. Some implementations may support concurrent status determinations for more than one resource 34. The multiple resources 34 may include resources provided in a communication equipment shelf, for example, in which case the resource monitor 26 might receive status information for multiple resources, on a per-shelf basis for instance, in the form of a bulk update.

The resource database 22 is populated, at least in part, by the resource monitor 26. An indication of the determined operational status of the or each resource 34, which may include current configurations for configurable resources, is stored in the resource database 22 by the resource monitor 26. Other information, such as resource identifiers for new resources 34 discovered by the resource monitor 26, and/or identifiers of communication equipment shelves for a communication equipment installation that has a distributed multiple-shelf architecture, may also be stored in the resource database 22 by the resource monitor 26.

Information that has already been stored in the resource database 22 may be modified by the resource monitor 26 in some embodiments. A record in the resource database 22 may be deleted by the resource monitor 26 when removal of a resource 34 is detected, for instance.

As shown, the apparatus 20 also includes an access controller 28, which controls access to the resource(s) 34 for performing operations. Through the resource client interface(s) 38, the access controller 28 is enabled to exchange information with the resource client(s) 36, which may use the resource(s) to perform any of various operations. In one embodiment, the resource manager 24, and specifically the resource client interface(s) 38, communicates with the resource client(s) 36 through Simple Network Management Protocol (SNMP). Interfaces that support SNMP, and other protocols or transfer mechanisms that may be used, will be apparent to those skilled in the art. Multiple resource client interface types may be provided in some embodiments.

A resource client 36 generally represents a system such as a test console or a software application that may perform operations using the resource(s) 34, or at least request access to use those resources. A test system, for example, may have a user console or other form of user interface through which an operator can enter, select, or otherwise cause a maintenance operation to be performed on a specific target resource, illustratively a communication line, or multiple target resources. Although shown in FIG. 2 as a direct connection, a resource client 36 may actually access a resource 34 indirectly, through an internal or external test head, for example.

Availability status of each of the one or more resources 34 monitored by the resource monitor 26 is determined, and to some extent controlled, by the access controller 28. When an operation is to be performed by a resource client 36, for example, the resource client may transmit to the access controller 28, through a resource client interface 38, a request for access to use the resource to perform the operation. This request may specify the operation to be performed and a target resource on which the operation is to be performed. The access controller 28 then identifies the resource(s) required to perform the requested operation. This may involve accessing the resource database 22 directly, and/or some interaction with the resource monitor 26. Thus, either or both of the access controller 28 and the resource monitor 26 may be involved in parsing or otherwise processing an operation request to identify the resources that are needed for that operation.

Operation to resource mappings may be determined in any of various ways. The resource database 22 or another data store (not shown) may store operation/resource mapping tables for instance. The required resources can then be identified by accessing these mapping tables. Data that is accessible to the resource manager 24 might also or instead specify the operations that can be performed for each possible target resource and the resources that are needed for those operations.

Information relating to physical connections, and more generally communication equipment or network topologies, may also be of use in identifying the resources that are needed to perform an operation. This type of information may additionally allow redundant or otherwise alternate resource combinations to be identified, as described in further detail below.

Other forms of data records may be or become apparent to those skilled in the art. In some embodiments, required resources may be specified in an operation request, allowing the required resources to be identified from the request itself. It should thus be appreciated that the present invention is not restricted to any specific mechanism for identifying resources that are associated with a specific operation.

According to an aspect of the invention, all resource client(s) 36 that can use the managed resource(s) 34 to perform operations will interact with the resource manager 24 to gain access or permission to use those resources. The access controller 28 can then maintain an accurate account of the availability status of all monitored resources. As it grants access to the resource(s) 34 in response to requests, for example, the access controller 28 may update records in the resource database 22 to indicate that those resources are "in use" or "reserved". An availability status indicator might be stored in the resource database 22 as a flag or data field in resource-specific data records, for instance. The access controller 28 may therefore, in one embodiment, determine the availability status of the resource(s) 34 by accessing the resource database 22.

It should be appreciated that the access controller 28 may determine whether to allow or deny access to a resource based on other information than availability status. Consider an example of a resource failure. When the resource monitor 26 detects the failure, it updates the operational status of that resource in the resource database 22 accordingly. However, the resource monitor 26 may, but might not necessarily, also update the availability status of that resource. If the failed resource was not in use or reserved for use at the time of its failure, then the resource database 22 might incorrectly indicate that the resource is available. In order to avoid a situation in which a resource client 36 is granted access to and tries to use a failed resource 34, the access controller 28 might also consider a resource's operational status in determining whether access to the resource should be granted.

The above example also illustrates a scenario in which cooperation between the resource monitor 26 and the access controller 28 might be in order. It may be useful for the access controller 28 to be advised of a resource failure so that an operation using that resource can be halted if it has not yet been completed. The resource client 36 that was performing the halted operation could then be notified of the failure and that the operation has been halted.

The access controller 28 may also support different operation priorities. Priority may be specified in operation information such as an operation request, or determined by the access controller 28 on some other basis, illustratively the source of a request. For example, a user-requested operation to test a customer connection might take precedence over a scheduled operation such as the application of a sealing or wetting current to a copper line over which data-only DSL communications are carried.

Request and/or operation priorities may be tracked by the access controller 28 by recording a priority indicator when access to a resource is granted. Priorities may be used, for example, to select between conflicting requests for access to the same resource(s) 34. Another possible use for request/operation priorities would be to determine whether a current operation for which access to a resource was previously granted should be halted so that access to the resource can be granted for another operation. A higher-priority operation request may pre-empt a lower-priority current operation. To pre-empt a current operation, the access controller 28 effectively seizes control of resource(s), and may notify the resource client 36 that was performing the current, halted operation that the operation has been halted and that its access to the resource(s) has been revoked. Access to the seized resource(s) is then granted for the higher-priority operation.

If the resource(s) 34 required to perform a operation are available, as determined by the access controller 28 on the basis of availability status and possibly other parameters such as those described briefly above, then the access controller may provide to the requesting resource client 36, through the interface(s) 38, a response to the request indicating that access to the resource(s) is granted. Request responses in which resource access is granted may include such operation information as identifiers of the required resource(s) 34 and/or how those resources should be configured.

Once resource access is granted, the resource client 36 uses the required resources. Use of resources by resource clients is described in further detail below.

At some time after completion of an operation, a resource client 36 may provide a completion indication to the access controller 28. The access controller 28 then updates the availability status of any of the resource(s) 34 that were used to perform the operation in the resource database 22 responsive to the indication.

If the access controller 28 determines that access to a required resource should not be granted, where the resource is not available or has failed for instance, then a response to an operation request indicates that requested resource access is denied. The requesting resource client 36 may then retry the operation request at a later time, or execute some other type of failure or exception procedure.

Some embodiments of the invention provide another option for handling unavailable resources. Suppose that two equipment shelves in a distributed communication equipment architecture each have a test unit. The failure of the test unit in one equipment shelf might not necessarily mean that tests on target resources associated with that equipment shelf cannot be performed. External cabling may be provided between those shelves, allowing the test unit in the other shelf to perform tests on target resources in the shelf having the failed test unit.

The existence of the external test cable may be reflected in the resource database 22 and detected by the access controller 28 or the resource monitor 26 so as to identify an alternate combination of resources that may be used to perform a requested operation. In another scenario, an operation request relates to a series of operations. If not all of the resources required for the series of operations are available, then the access controller 28 or the resource monitor 26 may determine a partial series of operations that can be performed using any available required and alternate/redundant resources.

A response to an operation request that grants access to use redundant or alternate resources may include substantially the same content as a response that grants access to required resources. However, in the case of granting access to use redundant or alternate resources in response to a request for access to specific required resources, a requesting resource client 36 might also be advised of the fact that the redundant or alternate resources should be used to perform the operation. Any restrictions in terms of a requested series of operations might also be conveyed to a requesting resource client 36 by the access controller 28.

Resource and operation management in accordance with embodiments of the invention will be further illustrated with reference to FIG. 3, which is a block diagram of a system 40 for managing resources in a communication system. The system 40 includes a user console 42 and a maintenance system 44 as examples of resource clients, communication equipment 46 operatively coupled to the user console and to the maintenance system, and one or more external test units 48 that are controllable by the maintenance system 44 and operatively coupled to the communication equipment. The communication equipment 46, which may include one or more equipment shelves, includes resource clients 52, one or more internal test units 54 operatively coupled to the resource clients, a resource manager 58 operatively coupled to the resource clients and to the internal test units, and one or more maintenance resources 56 operatively coupled to the internal test unit(s), to the resource manager, and to the external test unit(s) 48.

As noted above in conjunction with FIG. 2, FIG. 3 represents an example of one possible implementation of an embodiment of the invention. Other embodiments may include fewer, further, or different components with similar or different interconnections than shown. The types of connections through which the components of FIG. 3 are operatively coupled may also be implementation-dependent and include logical and/or physical couplings.

The resource clients 52, the resource manager 58, and the maintenance resource(s) 56 may be substantially the same as the similarly-labelled components that are shown in FIG. 2 and described above, although in the example of FIG. 3, embodiments of the invention are described in the context of testing or other maintenance operations performed on target resources using maintenance resources. The invention is in no way limited to this example, in which the resource(s) 56 includes one or more maintenance resources.

The user console 42 and the maintenance system 44 are examples of the types of devices or systems through which a user or other entity may perform maintenance operations using the maintenance resource(s) 56.

Through an internal test unit 54, a resource client 52 is able to use the maintenance resource(s) 56 to perform maintenance operations. These maintenance operations may include various line tests, application of sealing current, etc. Line tests may include, for example, narrowband tests such as those specified in the GR-909 industry specification, or the more full-featured GR-844 tests. Those skilled in the art will be familiar with the GR-909 and GR-844 industry specifications. Co-pending and commonly assigned U.S. patent application Ser. No. 11/403,322, now U.S. Pat. No. 7,970,105, incorporated in its entirety herein by reference, discloses an example of an internal test unit 54.

Those skilled in the art will be familiar with test heads and other forms of an external test unit 48, and the manner in which these external test units are controllable by a maintenance system 44. Interactions between such external test units and test resources will also be well understood.

In the system 40, however, the resource manager 58 monitors the operational status of the maintenance resource(s) 56 and also controls access to those maintenance resources by the external and internal test units 48, 54. When a maintenance operation is to be performed, a maintenance operation request is sent through a resource client 52 to the resource manager 58. If the maintenance resource(s) 56 needed to perform the maintenance operation are operational and are not in use, access to use the required maintenance resource(s) is granted. As noted above, a currently in-use maintenance resource 56 may be seized or reclaimed, for example, if a new request has a higher priority than a current maintenance operation for which access to use the maintenance resource was previously granted.

A grant/deny access response is returned to a requesting resource client 52 by the resource manager 58. If access to use the required maintenance resource(s) 56, or in some cases redundant or otherwise alternate maintenance resources, is granted to a requesting resource client 52, then the requesting resource client may itself use the maintenance resource(s) to perform the maintenance operation. In the case of a maintenance operation request originating with the user console 42, the requesting resource client 52 performs the maintenance operation through an internal test unit 54. The maintenance system 44 may instead perform a maintenance operation by controlling an external text unit 48. Although the maintenance system 44 interacts with the resource manager 58 to obtain access to use the maintenance resource(s) 56 to perform a maintenance operation, a resource client 52 need not be involved in actually performing the maintenance operation.

Figure 3:
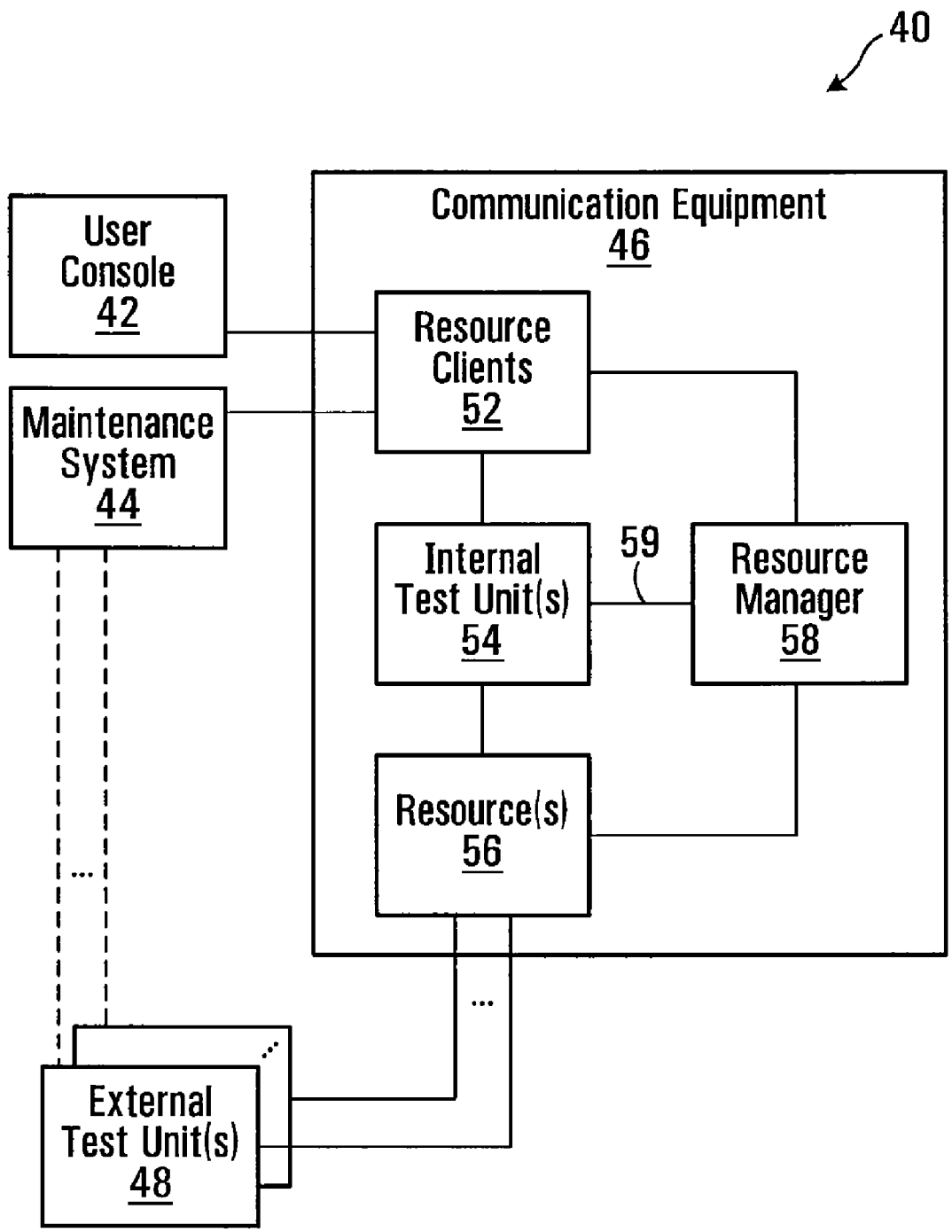
FIG. 3 is a block diagram of a system for managing resources in a communication system.

The internal test unit(s) 54 and the maintenance resource(s) 56 are shown separately in FIG. 3 so as to more clearly illustrate interactions between components of the system 40. It should be appreciated, however, that in some embodiments the resource manager 58 monitors, and may also control access to, the internal test unit(s) 54 in substantially the same manner as these functions are performed for the maintenance resource(s) 56. This is represented in FIG. 3 by the connection 59.

Figure 4:
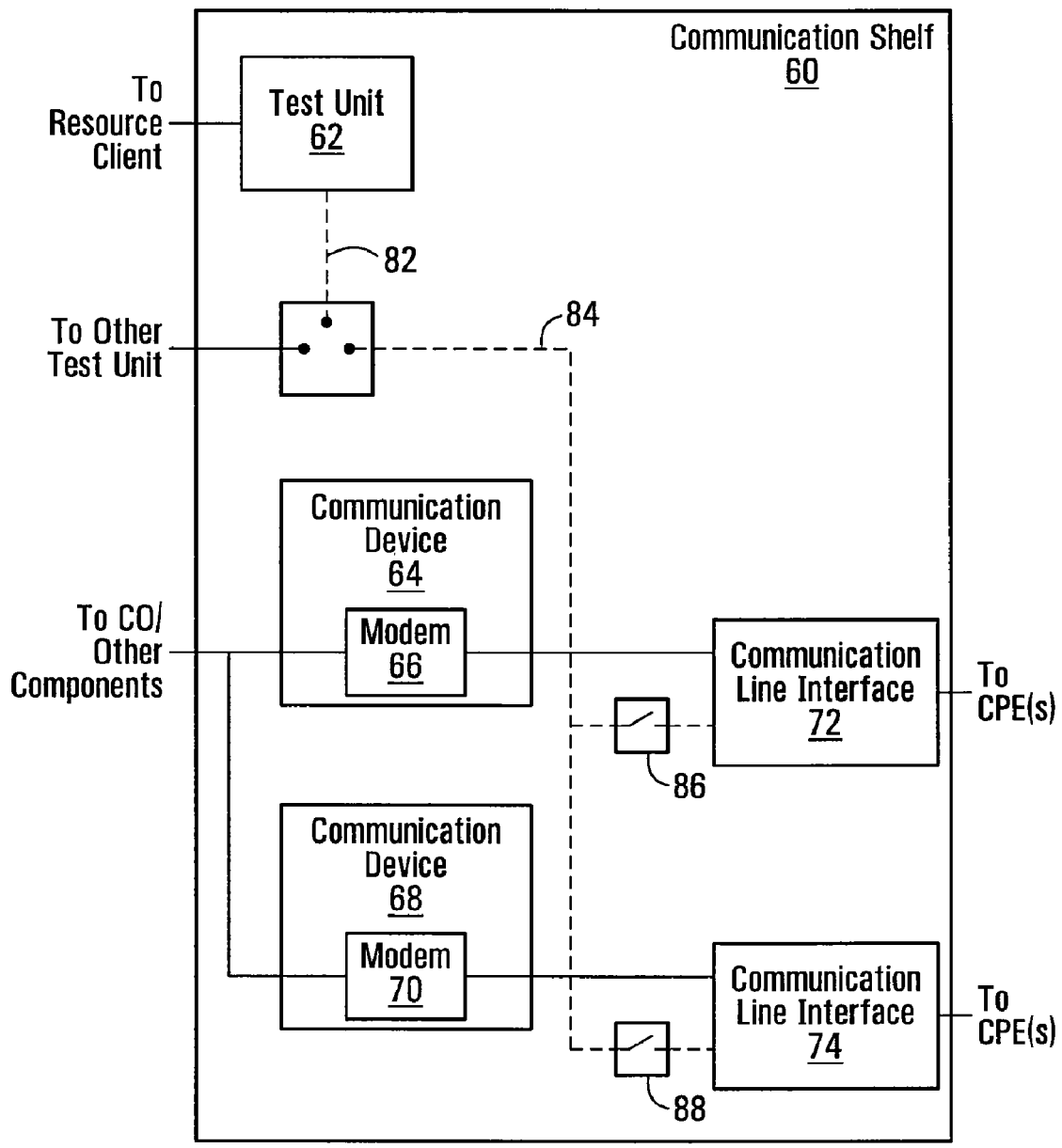
FIG. 4 is a block diagram of communication equipment.
Figure 5:
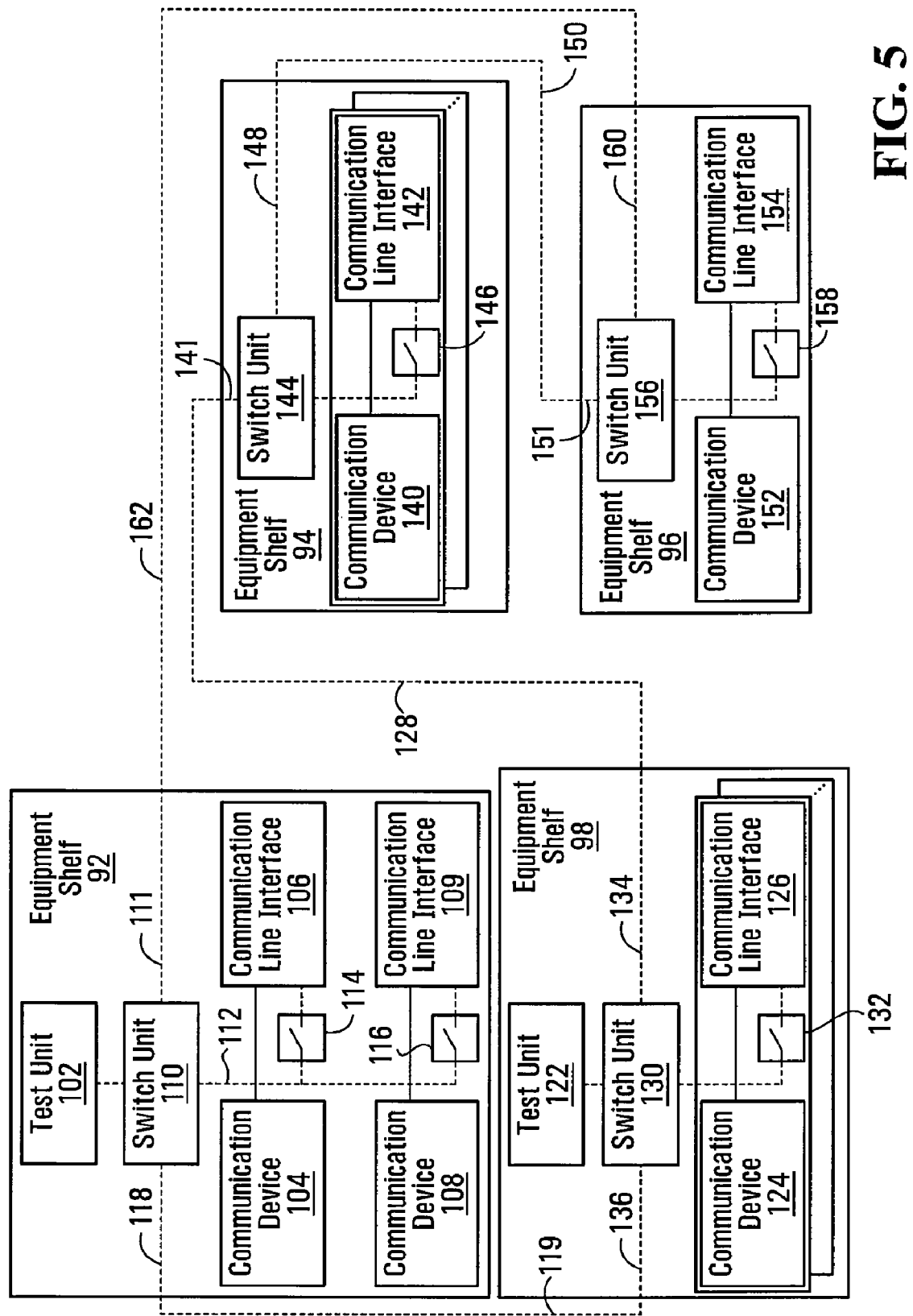
FIG. 5 is a block diagram of a distributed communication equipment architecture.
Figure 6:
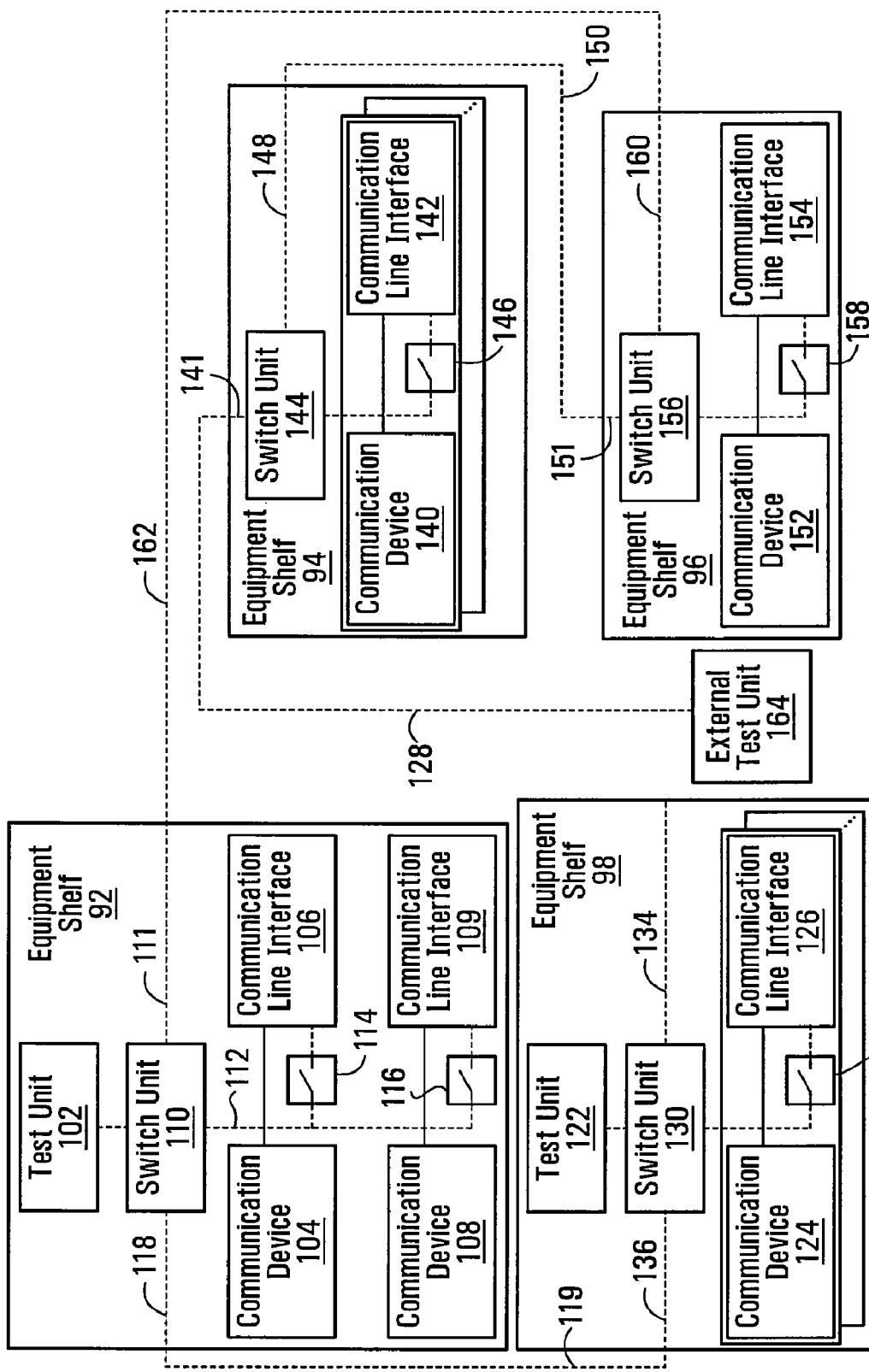
FIG. 6 is a block diagram of another distributed communication equipment architecture.

FIGS. 4 through 6 show examples of communication equipment in conjunction with which communication system resource management techniques according to embodiments of the invention might be implemented. As above, these examples are provided for illustrative purposes only, and represent non-limiting embodiments of the invention in the context of maintenance resources used to perform maintenance operations on target resources.

The communication equipment of FIG. 4 includes an equipment shelf 60 having an embedded test unit 62, communication devices 64, 68 that include respective modems 66, 70, and communication line interfaces 72, 74. The communication line interfaces 72, 74 are switchably coupled to the test unit 62 through controllable switches 82, 86, 88 and segments of an internal maintenance path 84, and are also operatively coupled to the modems 66, 70.

The communication equipment shelf 60 represents an example of one possible implementation of an embodiment of the invention in communication equipment. Other embodiments may include fewer, further, or different components with similar or different interconnections than shown.

For example, other components that have not been explicitly shown in FIG. 4 may be involved in transferring control information and/or communication traffic to the modems 66, 70 and the test unit 62. In a DSLAM, for example, communications with a CO may be enabled by a Gig-E interface, or multiple interfaces in some embodiments, through which information is exchanged with the modems 66, 70 and the test unit 62. Different types of interfaces for transferring traffic and control information are also contemplated. The invention is in no way limited to managing maintenance operations for communication lines supported by communication equipment having a structure as shown in FIG. 4, or specifically to communication lines as the only possible target resources on which maintenance operation may be performed.

The types of connections through which the components of FIG. 4 are operatively coupled may, as noted above with reference to FIGS. 2 and 3, be implementation-dependent and include logical and/or physical couplings.

The communication devices 64, 68 may be implemented, for example, in DSL line cards for installation in a DSLAM. In this case, the communication lines to CPEs serviced by the communication devices 64, 68 are DSL lines, and the communication line interfaces 72, 74 may be DSL ports provided on the DSL line cards or on separate port cards or "appliques".

A common implementation of the modems 66, 70, DSL modems in this example, is in DSL chipsets. More generally, hardware, software, firmware, or combinations thereof may be used to implement the modems 66, 70 and possibly other components of the communication devices 64, 68 and/or the communication equipment.

The communication line interfaces 72, 74 represent interfaces through which the communication devices 64, 68 exchange communication signals with CPEs. Where a CPE communication line is a DSL connection, the interfaces 72, 74 may include physical ports and associated DSL port circuitry. Other examples of communication line interfaces will be apparent to those skilled in the art.

Line cards and other communication devices may support communication lines with more than one remote device such as a CPE. A single DSL line card might support 24, 48, or more ports and customer connections, for example. It should therefore be appreciated that the techniques disclosed herein may be applied to one, or more than one, communication line.

The test unit 62, as described above with reference to FIG. 3, can be used by a resource client to perform maintenance operations.

The switches 82, 86, 88, illustratively relays, are also controllable by a resource client, through the test unit 62 or another test unit, so as to connect the internal maintenance path 84 to a communication line, or more specifically to the interface 72, 74 for such a line, on which a maintenance operation is to be performed. Although local control of the switches 82, 86, 88 may be provided by the test unit 62, the ultimate control of the switches would rest with a resource client, in that the resource client controls the test unit 62.

The switch 82, which has been shown as a single block but may include multiple switch elements such as a relay matrix, allows the maintenance path 84 to be coupled to the internal test unit 62 or to another test unit. The other test unit may be an internal test unit of another equipment shelf in a distributed communication equipment architecture or an external test unit such as a test head, for example. This provides flexibility in performing maintenance operations, and may also enable redundancy, as described in further detail below.

The test unit 62, the internal maintenance path 84, and the switches 82, 86, 88 represent examples of maintenance resources in the communication equipment shelf 60.

Considering first the monitoring of operational states of the test unit 62, the path 84, and the switches 82, 86, 88, any of various monitoring schemes may be provided. As noted above, a resource monitor may send queries to the maintenance resources of the communication equipment shelf 60. In one embodiment, monitoring queries might be directed to the test unit 62. This monitoring scheme may be suitable, for example, where the test unit 62 provides local control of maintenance resources at the communication equipment shelf 60 and resource clients interact with the test unit to perform maintenance operations.

In response to a monitoring query, the test unit 62 returns operational status information, which may include identifiers of each maintenance resource and a current configuration of each configurable maintenance resource, for example. In the case of the switches 82, 86, 88, the operational status information might include an indication of the position of each switch. The switch position indications may be an indication of whether the local test unit 62 or another test unit is coupled to the path 84 by the switch 82 and an identifier of the communication line or interface 72, 74 to which the path 84 is currently coupled by the switches 86, 88, for instance.

According to some embodiments, a single operational status indication might apply to multiple maintenance resources. An indication that the internal maintenance path 84 is currently connected to the communication line interface 72, for example, may serve as an indication that the maintenance path and other resources associated with that path, including the switches 86, 88, are in working order and configured in a certain way.

The test unit 62 might also provide an indication as to its own operational status. This status indication might instead be an implied indication, in that a response from the test unit 62 may indicate that the test unit is in working order whereas the absence of a response to a query within a response time window may be interpreted as an indication of some sort of operational problem with the test unit. An explicit indication of operational status of the test unit 62, or respective status indications for test unit sub-components such as testing circuits and a sealing current generator for instance, are also contemplated.

Some embodiments of the invention may support maintenance resource-specific queries. A query/response module might be provided for each monitored maintenance resource, for example.

A query/response mechanism represents one example of a possible monitoring scheme. Automatic updates could also or instead be provided as maintenance resource installations, removals, failures and/or configuration changes are detected by the test unit 62 or another component of the communication equipment shelf 60.

Operational status information may be transferred from the communication equipment shelf 60 to a remote resource monitor using the same transfer mechanism as resource manager to equipment transfers. An in-band signalling scheme, as described above, is one example of a possible transfer mechanism. Where the resource monitor is also implemented in the equipment shelf 60, a local transfer mechanism through an equipment backplane, for example, might be used.

Use of maintenance resources at the communication equipment shelf 60 by a resource client may be accomplished by transferring control information from the resource client to at least a subset of the maintenance resources. It should be appreciated that not all maintenance resources might be controllable. The internal maintenance path 84, for example, may be considered a maintenance resource but is not itself controllable, whereas the switches 82, 86, 88 are controlled to connect the maintenance path 84 in a particular way to perform a maintenance operation.

Transfer of control information may be accomplished using the same transfer scheme as for monitoring information, illustratively an in-band signalling scheme. As described above in the context of resource monitoring, control of maintenance resources may be direct and resource-specific, or indirect, through the test unit 62 or another test unit. Directly controllable maintenance resources would have an associated control interface through which control information is received from a resource client. In an indirect control scheme, a resource client provides control information to the test unit 62, and the test unit controls maintenance resources to actually perform maintenance operations.

When a resource client has been granted access to use maintenance resources for applying a sealing current to a particular communication line, for example, the resource client may send to the test unit 62 instructions to apply sealing current to the line. In one embodiment, the instructions indicate that sealing current is to be applied and identify the communication line or interface to which the sealing current is to be applied, and the test unit 62 controls the switches 82, 86, 88 to connect its sealing current generator to the appropriate communication line interface 72, 74. A resource client may have more direct control over maintenance resources in some embodiments, to control the switches 82, 86, 88 to connect the internal maintenance path 84 to a communication line interface 72, 74, and then control the test unit 62 to output a sealing current on the maintenance path 84 after the path has been switched.

In general, it may be useful to consolidate local control of maintenance resources at the test unit 62, so as to avoid a resource client having to directly control each maintenance resource involved in performing a maintenance operation.

FIG. 4 illustrates communication equipment that is implemented using a single equipment shelf. The present invention can also be extended to manage maintenance operations for multiple shelves of a distributed communication equipment architecture. FIG. 5 is a block diagram of one such architecture.

For simplicity, internal details of the communication devices 104, 108, 124, 140, 152 have not been included in FIG. 5. A resource manager, which might also be provided in one of the shelves in the distributed architecture, has similarly not been explicitly shown so as to avoid further complicating the drawing.

The communication equipment shelf 92 may be substantially the same as the communication equipment shelf 60 (FIG. 4), and includes a test unit 102, communication devices 104, 108, and a controllable switch unit 110 and switches 114, 116 for connecting the test unit, or another test unit coupled to the switch unit 110 through an internal maintenance path segment 111, to the communication line interfaces 106, 109 through an internal maintenance path segment 112 or to an external connector through a path segment 118.

The communication devices 104, 108 represent communication devices that are installed in one equipment shelf 92. As described above with reference to FIG. 4, the single test unit 102 may perform maintenance operations on any of the communication lines supported by any of the communication devices 104, 108 in an equipment shelf.

The distributed architecture shown in FIG. 5 also includes other equipment shelves 94, 96, 98 in which other communication devices 124, 140, 152 have been installed. Examples of distributed architectures in which the shelf 92 is a host shelf and the shelves 94, 96, 98 are expansion shelves have been disclosed in co-pending and commonly assigned U.S. patent application Ser. No. 11/264,451, entitled "REMOTE CONTROL AND REDUNDANCY FOR DISTRIBUTED COMMUNICATION EQUIPMENT", and filed on Nov. 1, 2005, and Ser. No. 11/264,475, entitled "DISTRIBUTED COMMUNICATION EQUIPMENT ARCHITECTURES AND TECHNIQUES", and also filed on Nov. 1, 2005, the entire contents of both of which are incorporated herein by reference.

The communication devices 104, 108, 124, 140, 152 may have a substantially similar structure, and are identical line cards in some embodiments. Metal test cables or other connections 119, 128, 150, 162 may be used to provide an external maintenance path between the test unit 102 and the shelves 94, 96, 98. Paths to each communication line supported by the communication devices 124, 140, 152 and operatively coupled to the communication line interfaces 126, 142, 154 may be completed through internal switched maintenance paths or other types of connections represented by the switches 132, 146, 158.

The shelves 92, 94, 96, 98 may be connected serially in a "daisy chain", as shown, through the connections 119, 128, 150, 162 and the controllable switch units 110, 130, 144, 156. These external connections and switch units illustrate one possible arrangement for coupling equipment shelves in a distributed communication equipment architecture together. Star- or hub-type inter-shelf connections, as well as other topologies, are also possible.

As described above with reference to FIG. 4, any communication line supported by communication equipment can be connected to an internal maintenance path. The internal maintenance path is coupled to a central access point, represented in FIG. 5 by the controllable switch units 110, 130, 144, 156. This central access point may be coupled to an internal test unit 102, 122 in the case of the equipment shelves 92, 98, or to a test unit in another equipment shelf through the maintenance path segments 111, 136, 141, 151 and the external connections 119, 128, 150, 162.

The equipment shelf 98 illustrates an implementation in which multiple shelves in a distributed communication equipment architecture include respective test units. The equipment shelf 98 is part of the same distributed communication equipment as the shelves 92, 94, 96, but has its own test unit 122. The equipment shelf 92 may be a host shelf for other purposes such as transferring communication traffic. However, the test unit 122 allows multiple maintenance operations to be performed on communication lines supported by the communication device(s) 124 and the communication line interface(s) 126 while a maintenance operation is simultaneously being performed in one of the equipment shelves 92, 94, 96 by the test unit 102. The switch units 110, 130 may thus establish multiple connections between their terminals or ports. The switch unit 130, for example, might be controlled to connect the external connections 119, 128 so as to couple the test unit 102 to the equipment shelf 94, even if a maintenance operation is currently being performed in the equipment shelf 98 by the test unit 122.

Each test unit 102, 122 may independently perform maintenance operations. Where the shelves 92, 98 are interconnected as shown at 119, maintenance operations for the shelf 98 may be performed by either its test unit 122 or the test unit 102.

Thus, in a distributed architecture, one, some, or all equipment shelves may include an internal test unit. In the example shown in FIG. 5, the test unit 102 provides a measure of redundancy protection for the test unit 122 in that maintenance operations for the equipment shelf 98 can be performed by the test unit 102 if the test unit 122 fails. As noted above, this type of redundancy or alternate resource arrangement can in some embodiments be determined by an access controller and/or a resource monitor.

If a resource client submits a request to perform a maintenance operation on a communication line that is operatively coupled to the communication line interface 126, but the test unit 122 is not operational, then an access controller might respond to the maintenance operation request with an indication that the maintenance operation should be performed by controlling the test unit 102 instead of the test unit 122. Depending on whether a local central control model or a resource-specific control model is implemented, the access controller might also identify, in the response to the request, the switches 110, 130, 132 and how those switches should be configured. It should be noted that whether the resource client directly or indirectly controls the switches 110, 130, 132, the availability status of the test unit 102, as well as the switches, would be updated accordingly by the access controller.

More complete redundancy protection, for the test unit 102 for instance, may also be supported where the test unit 122 can be coupled to the internal maintenance path 112 of the equipment shelf 92. Such a connection may be made, for example, through the external connections 128, 150, 162. Where the external connection 119 supports bidirectional transfers or multiple unidirectional cables are installed between the shelves 92, 96, the test unit 122 may be switchably coupled to the internal maintenance path 112 of the shelf 92 through the switch unit 130, the path segment 136, the external connection 119, the path segment 118, and the switch unit 110. Monitoring and control functions in a fully redundant system may otherwise be substantially as described above.

FIG. 6 is a block diagram of another distributed communication equipment architecture. The components shown in FIG. 6 may be substantially similar to the similarly-labelled components shown in FIG. 5 and described above.

In the system of FIG. 6, however, the external connection 128 between the equipment shelves 98, 94 is replaced with a connection to an external test unit 164, illustratively a test head. Where the external connections 119, 128, 150, 162 implement a unidirectional daisy chain, the test unit 102 may perform maintenance operations for the equipment shelves 92, 98, the test unit 122 may perform maintenance operations for the equipment shelf 98, and the external test head 164 may perform maintenance operations for any of the equipment shelves 94, 96, 92, 98.

According to an alternate implementation of the distributed architecture of FIG. 6, the external connection 162 operatively couples the maintenance path segments 111, 134 of the equipment shelves 92, 98, to provide full redundancy protection for the test units 102, 122.

Figure 7:
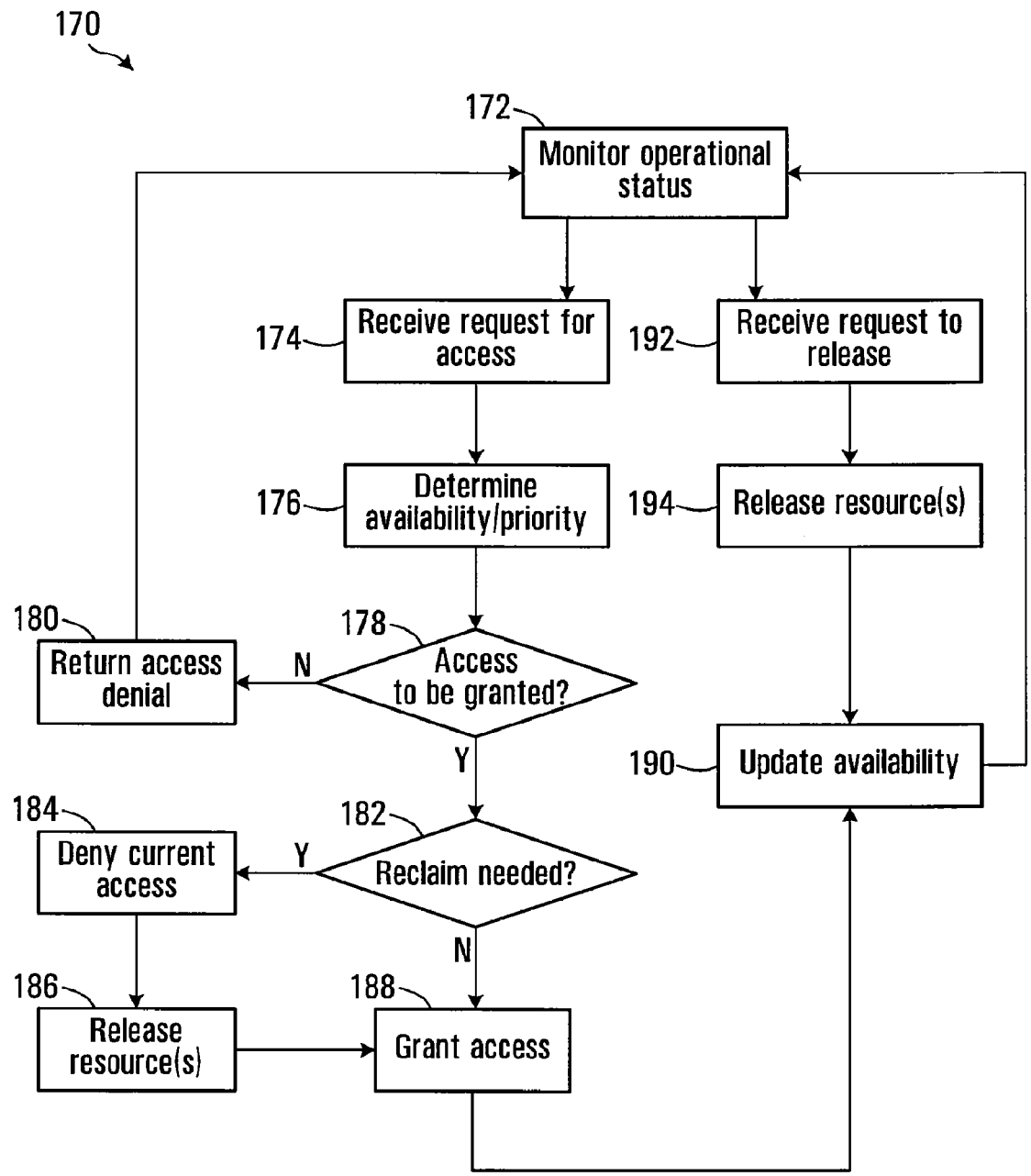
FIG. 7 is a flow diagram of a communication system resource management method.

FIG. 7 is a flow diagram of a communication system resource management method. The method 170 includes monitoring an operational status of one or more resources at 172. This may involve exchanging information with communication equipment that includes the resource(s), as described above. When a resource access-related request is received, the method proceeds in a different manner depending on the type of request.

At 174, a request for access to use the resource(s) for performing an operation, such as a maintenance operation on a target resource, is received. The availability status of the resource(s) is then determined at 176. Priorities and/or other parameters may also be determined at 176.

Based on the determined availability status and possibly other parameters, a decision is made at 178 as to whether access to the resource(s) should be granted or denied in response to the request. If access is denied, then an indication to this effect is returned to a requesting resource client at 180.

If access to the resource(s) is to be granted, then a determination is then made at 182 as to whether the resource(s) need to be reclaimed from another resource client or operation. Where a current operation for which access to use the resource(s) was previously granted is in progress, the current operation might be pre-empted. The decision to pre-empt a current operation at 182 may involve determining a priority of the current operation and a priority of the request received at 174. If the request has a higher priority than the current operation, then the current operation could be halted. The current access to the resource(s) is denied at 184, illustratively by sending an access denial or reclaim indication to the resource client that is running the current operation. Each reclaimed resource is then released at 186 by revising the availability status of the reclaimed resource(s) in a resource database, for example.

Access to the available resource(s), which may include one or more reclaimed resources, is granted at 188, and the availability status of the resource(s) is updated at 190. The requesting resource client may then use the resource(s) to perform the operation.

When an operation completion indication or other form of request to release one or more resources is received at 192, the resources are released at 194 and thus become available for use in another operation. As shown at 190, the availability of the released resource(s) is updated in a resource database.

It should be appreciated that the method 170 is illustrative of one embodiment of the invention. Other embodiments may include further, fewer, or different operations performed in a similar or different order than shown.

For example, resource monitoring at 172 may be ongoing during access control tasks, and/or resume once access to use any requested resource(s) has been granted or denied.

As described above, alternate or redundant resources may be identified in the event that access to the resource(s) is denied at 178.

Further variations may be or become apparent to those skilled in the art.

According to embodiments of the invention as disclosed herein, a resource manager is used to oversee the allocation of resources within a system. Resources may include components on many electronic circuit cards that provide switchable maintenance path functionality to link a test unit to a target resource to be tested, for example. Resources may also include a chain configuration that provides multi-shelf maintenance capabilities. A test unit such as an external or integrated test head represents another example of a resource.

A resource manager may monitor the chain configuration and the operational and availability states of resources as they become available or unavailable in order to allow or disallow operation requests, or even cancel operations that are in progress but are no longer possible. Termination of operations that are impacted by changes in resource availability or configuration changes avoids unpredictable and unreliable results that would be obtained if such operations were allowed to continue.

As an example, with reference again to FIG. 5, if the internal test unit 122 fails in the shelf 98, then using the maintenance path daisy-chain and the internal test unit 102 in the shelf 92, the system is still capable of performing maintenance operations in the shelf 98. The system may monitor the hardware devices that are functional in a maintenance operation request and attempt to achieve the possible best scenario of maintenance resource usage by identifying redundant or alternate available maintenance resources. In the case of a maintenance resource being unavailable due to a failure, the system updates its information base and re-adjusts itself for ongoing and future tests.

As operation requests are granted, resources are reserved for each operation, and after its completion, the allocated resources are released for use in performing other operations.

A central process to manage resources shared by various processes may be implemented ensure consistent and reliable results with the added benefit of finding potential alternate methods to obtain the same results.

The techniques disclosed herein may also be used to manage resources and operations for distributed equipment architectures, illustratively distributed DSLAMs. The IP DSLAM market, for example, is a competitive and fast growing market, but many IP DSLAMs are not carrier grade. Having integrated and effective resources in an IP DSLAM can be important in providing carrier grade service levels. Therefore, techniques that improve IP DSLAM testing and other maintenance capabilities in a cost effective manner may be of particular value.

What has been described is merely illustrative of the application of principles of embodiments of the invention. Other arrangements and methods can be implemented by those skilled in the art without departing from the scope of the present invention.

For example, the divisions of functions shown in the drawings are illustrative of embodiments of the invention. Further, fewer, or different elements may be used to implement the techniques disclosed herein.

It should also be appreciated that resource monitoring and access control may embody substantially independent aspects of the invention. Embodiments of the invention may enable resource monitoring, access control, or both. Where maintenance resource monitoring is provided without access control for instance, a resource monitor may receive a maintenance operation request from a resource client and return to the resource client an indication of the operational status of one or more maintenance resources to perform a maintenance operation on a target resource, for instance. Such interaction between a resource monitor and a resource client could be enabled, for example, by operatively coupling one or more resource client interfaces 38 to the resource monitor 26 as shown in FIG. 2.

Security measures for enforcing access control have not been described in detail above, but various options for providing this functionality will be apparent to those skilled in the art. An authentication mechanism could be used by an access controller to ensure that a resource client from which an access request is received is authorized to perform specific operations or to use particular resources or equipment. Actual control of resources might require a valid ticket or code issued by the access controller. Other security schemes may also or instead be provided.

In addition, although described primarily in the context of methods and systems, other implementations of the invention are also contemplated, as instructions or data structures stored on a machine-readable medium, for example.

As described above, data structures may be provided for maintaining resource operational statuses, resource availability statuses, and/or mappings between operations and resources. An operational status data structure might include a data record, for each monitored resource, that includes a resource identifier and an indication of operational status of the resource to perform a particular maintenance operation for instance. An availability data structure may be substantially similar, including per-resource data records, each of which identifies a resource and indicates its availability status. A mapping data structure might include per-resource records, per-operation records, or some other arrangement of data identifying resources, operations, and including either explicit or implicit indications of relationships between resources and operations. Resource-operation relationships could be implicit in record formats, where resources are listed in per-operation records or operations are listed in per-resource records for instance.

These data structure examples are provided solely for the purposes of illustration. Other specific structures or formats are also contemplated. For example, a status data structure might include indications of both operational and availability status. In some embodiments, a single status indication is used for both operational and availability status. An indicator might indicate that a resource is reserved (i.e., in service but unavailable), operational (i.e., in service and available), or failed/out of service (i.e., not in service and thus unavailable).

Data structures might also or instead be provided for other purposes, for tracking or recording operation priorities for instance.

We claim:

1. An apparatus comprising:
an interface for enabling transfer of status information associated with a plurality of distributed maintenance resources in a distributed communication equipment architecture, the maintenance resources comprising configurable maintenance resources for performing maintenance operations to test one or more target communication system resources, the configurable maintenance resources comprising a plurality of switches controllable to operatively couple a test unit, through a maintenance path, to a communication system resource on which a maintenance operation is to be performed;
a resource monitor operatively coupled to the interface and operable to determine, based on status information received through the interface, an operational status of each maintenance resource of the plurality of maintenance resources, the operational status comprising a current configuration of the configurable maintenance resources; and
an access controller operatively coupled to the resource monitor and operable to identify each switch of the plurality of switches and each other maintenance resource of the plurality of maintenance resources that is required to perform a particular maintenance operation, to determine a current availability status of each required switch and each other required maintenance resource to perform the particular maintenance operation, and to control access to each required switch and each other required maintenance resource based on the determined operational status and availability status,
at least one of the interface, the resource monitor, and the access controller being implemented using hardware.

2. The apparatus of claim 1, further comprising:
a memory operatively coupled to the resource monitor,
wherein the resource monitor is further operable to store in the memory an indication of the determined operational status of each maintenance resource.

3. The apparatus of claim 1, wherein the distributed communication equipment architecture comprises multiple communication equipment shelves which exchange communication signals, and wherein the status information is exchanged between the communication equipment shelves in the communication signals.

4. The apparatus of claim 1, further comprising:
a resource client interface operatively coupled to the resource monitor, the resource client interface enabling the resource monitor to exchange information with a resource client, the resource client being operable to use one or more maintenance resources of the plurality of maintenance resources to perform a maintenance operation,
wherein the resource monitor is operable to receive a maintenance operation request from the resource client through the resource client interface, to determine an operational status of each of the one or more maintenance resources, and to return to the resource client through the resource client interface, in response to the maintenance operation request, an indication of the determined operational status of the one or more maintenance resources to perform the requested maintenance operation.

5. The apparatus of claim 1, further comprising:
a resource client interface operatively coupled to the access controller, the resource client interface enabling the access controller to exchange maintenance operation information with a resource client, the resource client being operable to use one or more maintenance resources of the plurality of maintenance resources to perform a maintenance operation,
wherein the access controller is operable to receive a maintenance operation request from the resource client through the resource client interface, and to return to the resource client through the resource client interface a response to the request indicating whether access to use the one or more maintenance resources is granted or denied.

6. The apparatus of claim 5, wherein the access controller is further operable, where access to use a maintenance resource is denied, to determine whether an alternate maintenance resource is available, and to control access to use the alternate maintenance resource based on the determined operational status and availability status of the alternate maintenance resource where an alternate maintenance resource is available.

7. The apparatus of claim 5, wherein the access controller is further operable to update the availability status of each of the one or more maintenance resources where access to use the one or more maintenance resources is granted.

8. The apparatus of claim 5, wherein the access controller is further operable to determine a priority of the request, and to determine whether access to use the one or more maintenance resources should be granted or denied based on the determined operational status and the availability status of the one or more maintenance resources and the determined priority of the request.

9. The apparatus of claim 8, wherein the access controller is operable to halt a current maintenance operation for which access to use any of the one or more maintenance resources was previously granted, and to grant access for the resource client to use the one or more maintenance resources in response to the request where the request has a higher priority than the current maintenance operation.

10. The apparatus of claim 5, wherein the access controller is further operable to receive from the resource client through the resource client interface an indication that the maintenance operation for which access was granted to use the one or more maintenance resources has completed, and to update the availability status of each of the one or more maintenance resources in response to receiving the indication.

11. The apparatus of claim 5, further comprising:
a memory, operatively coupled to the access controller, for storing a respective record associated with each of the one or more maintenance resources, each record comprising an indication of the availability status of a respective one of the one or more maintenance resources,
wherein the access controller is operable to determine the availability status of each required switch and each other required maintenance resource by accessing the records in the memory.

12. The apparatus of claim 1,
wherein the one or more target resources comprises a communication line over which communications are supported by the communication equipment.

13. The apparatus of claim 1, wherein
the resource monitor is further operable to update operational status of the plurality of maintenance resources based on status information received through the interface.

14. The apparatus of claim 13, wherein
the access controller is further operable to halt the particular maintenance operation where access to each required switch and each other required maintenance resource is granted and a change in operational status of any of the required switches and other required maintenance resources impacts the particular maintenance operation.

15. The apparatus of claim 1, wherein
the distributed communication equipment architecture comprises a plurality of equipment shelves and external connections between the plurality of equipment shelves,
the one or more target communication system resources comprises a target communication system resource at each equipment shelf,
each equipment shelf comprises a first switch and a second switch connected to the first switch, the first switch being controllable to operatively couple the test unit either to an external connection between the equipment shelf and another equipment shelf of the plurality of equipment shelves, or to the second switch, the second switch being controllable to operatively couple the first switch to the target communication system resource at the equipment shelf.

16. The apparatus of claim 15, wherein the external connections and the first switches in the plurality of equipment shelves serially interconnecting the equipment shelves in a daisy chain.

17. The apparatus of claim 15, wherein
the test unit comprises an external test unit operatively coupled to the first switch of one equipment shelf of the plurality of equipment shelves through a further external connection,
the plurality of equipment shelves comprises an equipment shelf that comprises an internal test unit operatively coupled the first switch of the equipment shelf,
the first switches and the second switches of the plurality of equipment shelves being controllable to operatively couple the external test unit and the internal test unit to respective target communication system resources of the plurality of target communication system resources.

18. Communication equipment comprising:
the apparatus of claim 1; and
the plurality of maintenance resources.

19. The communication equipment of claim 18,
wherein the communication equipment comprises a plurality of equipment shelves, the plurality of equipment shelves supporting communications on respective communication lines and comprising respective maintenance resources of the plurality of maintenance resource for performing maintenance operations to test the respective communication lines as target resources of the one or more target resources, one equipment shelf of the plurality of equipment shelves comprising the interface, the resource monitor, and the access controller,
wherein the interface enables transfer of status information between the resource monitor and each maintenance resource of the one equipment shelf and between the resource monitor and each maintenance resource of each other equipment shelf of the plurality of equipment shelves, and
wherein the resource monitor is operable to determine an operational status of each maintenance resource of each equipment shelf of the plurality of equipment shelves.

20. The communication equipment of claim 19,
wherein each equipment shelf of the plurality of equipment shelves comprises an internal maintenance path and interconnections between communication equipment components, each internal maintenance path comprising internal maintenance path segments connected to switches of the plurality of switches,
wherein the communication equipment further comprises respective external connections between respective internal maintenance path segments of different equipment shelves of the plurality of equipment shelves,
wherein the switches are controllable to operatively couple the test unit to any of the communication lines through a maintenance path comprising at least internal maintenance path segments and multiple switches of the plurality of switches, and wherein the maintenance resources for which an operational status is determined comprise each respective external connection.

21. A machine-implemented method of managing a plurality of distributed maintenance resources in a distributed communication equipment architecture, the maintenance resources comprising configurable maintenance resources for performing maintenance operations to test one or more target communication system resources, the configurable maintenance resources comprising a plurality of switches controllable to operatively couple a test unit, through a maintenance path, to a communication system resource on which a maintenance operation is to be performed, the method comprising:
 a resource interface receiving status information from the plurality of maintenance resources;
 a resource monitor determining, based on the status information received through the resource interface, an operational status of each maintenance resource of the plurality of maintenance resources, the operational status comprising a current configuration of the configurable maintenance resources;
 a resource client interface receiving, from a resource client which is operable to perform a particular maintenance operation, a request for access to use one or more of the maintenance resources in performing the particular maintenance operation;
 an access controller identifying each switch of the plurality of switches and each other maintenance resource of the plurality of maintenance resources that is required to perform the maintenance operation;
 the access controller determining a current availability status of each required switch and each other required maintenance resource to perform the particular maintenance operation; and
 the access controller determining, based on the determined operational status and availability status, whether to grant or deny access to use each required switch and each other required maintenance resource in response to the request,
 at least one of the resource interface, the resource monitor, the resource client interface and the access controller being implemented using hardware.

22. The method of claim 21, further comprising:
 determining a priority of the request,
 wherein determining whether to grant or deny access to use each required switch and each other required maintenance resource comprises determining whether to grant or deny access to use each required switch and each other required maintenance resource based on the determined operational status and availability status of each required switch and each other required maintenance resource and the determined priority of the request.

23. The method of claim 22, further comprising, where a current maintenance operation for which access to use a required switch or other required maintenance resource was previously granted is in progress:
 determining a priority of the current maintenance operation; and
 where the request has a higher priority than the current maintenance operation, halting the current maintenance operation; and
 granting, in response to the request, access to use the required switch or other required maintenance resource for which access was previously granted for the current maintenance operation.

24. The method of claim 21, further comprising, where access to use each required switch and each other required maintenance resource is granted in response to the request:
 receiving from the resource client an indication that the particular maintenance operation has completed; and
 updating the availability status of each required switch and each other required maintenance resource.

25. The method of claim 21, further comprising, where access to use a required switch or other required maintenance resource is denied:
 determining whether an alternate maintenance resource is available; and
 controlling access to the alternate maintenance resource based on the determined operational status and availability status of the alternate maintenance resource where an alternate maintenance resource is available.

26. The method of claim 21, further comprising:
 using each required switch and each other required maintenance resource to perform the particular maintenance operation where access to each required switch and each other required maintenance resource is granted.

27. The method of claim 21, further comprising:
 updating operational status of the plurality of maintenance resources based on status information received through the resource interface.

28. The method of claim 27, further comprising:
 halting the particular maintenance operation where access to each required switch and each other required maintenance resource is granted and a change in operational status of any of the required switches and other required maintenance resources impacts the particular maintenance operation.

* * * * *